(No Model.)
S. P. WELLER, S. WANEE & G. ROESCH.
CAR BRAKE.
No. 274,869. Patented Mar. 27, 1883.
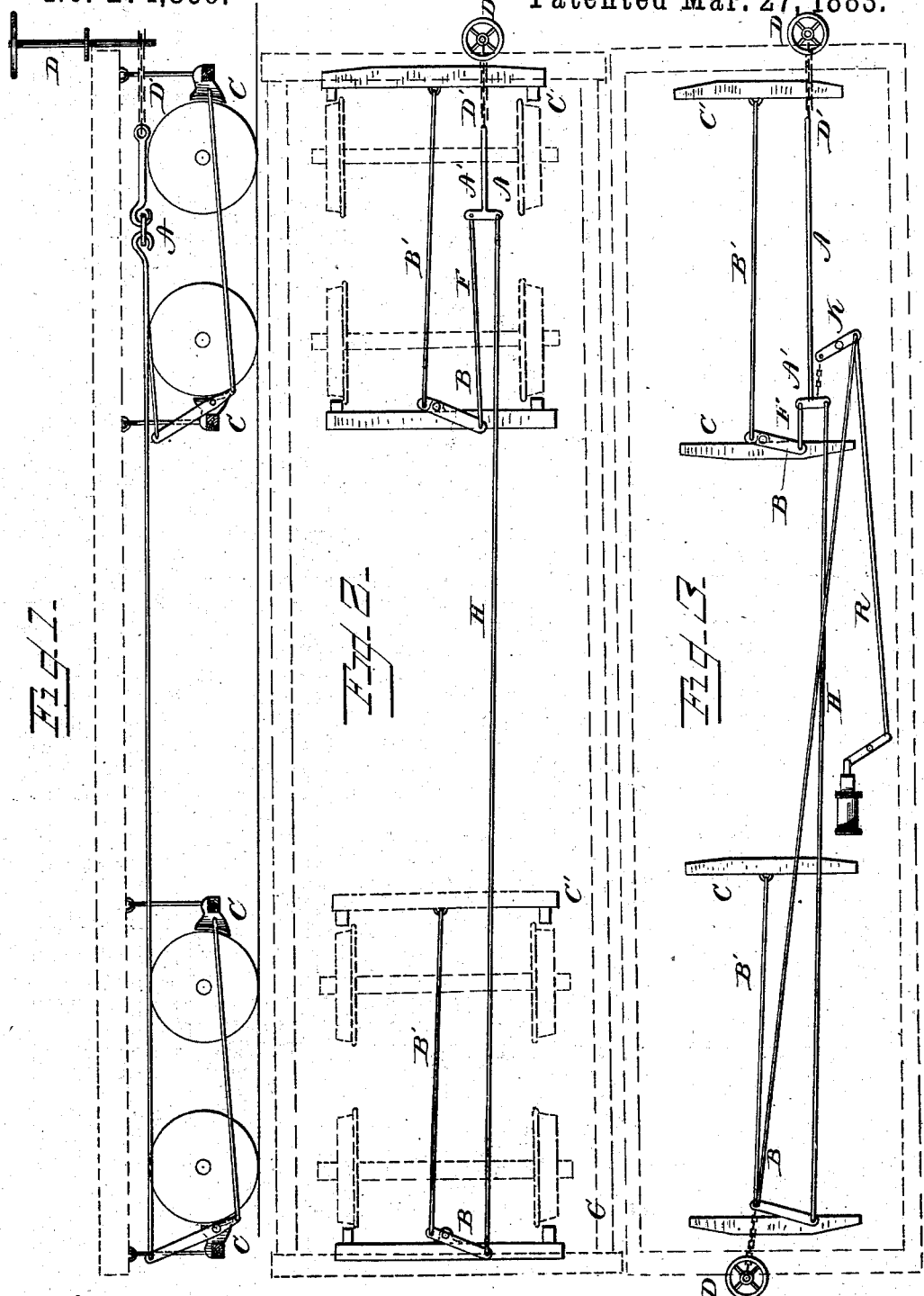

UNITED STATES PATENT OFFICE.

SIMON P. WELLER, SILVANUS WANEE, AND GEORGE ROESCH, OF DENVER, COLORADO, ASSIGNORS OF ONE-FOURTH TO AUGUST RISCHE AND CARL A. FUNKE.

CAR-BRAKE.

SPECIFICATION forming part of Letters Patent No. 274,869, dated March 27, 1883.

Application filed January 5, 1883. (No model.)

*To all whom it may concern:*

Be it known that we, SIMON P. WELLER, SILVANUS WANEE, and GEORGE ROESCH, citizens of the United States, residing at Denver, in the county of Arapahoe and State of Colorado, have invented certain new and useful Improvements in Car-Brake Connections, of which the following is a specification, reference being had therein to the accompanying drawings.

The object of our invention is to supply a simple arrangement of actuating the levers and rods to a double-acting brake, so as to obtain the largest amount of friction on the car-wheels and distribute the strain of the brake-shoes equally on all the wheels.

The nature of our invention consists in the arrangement of railway-car-brake connections, as will hereinafter be more fully set forth.

In order to enable others skilled in the art to which our invention appertains to make and use the same, we will now proceed to describe its construction and operation, referring to the annexed drawings, in which—

Figure 1 is a side elevation of brake connecting-rods and equalizer. Fig. 2 is a plan of the rods and equalizer when attached to the brake-staff wheel. Fig. 3 is a plan of rods and equalizer, showing the arrangement for attaching air, steam, or vacuum brake.

A represents a rod connected at one end to the brake-staff chain D', which is fixed to the lower end of staff D.

A' is the equalizing-bar, connected to one end of lever B by rod F.

B' is a rod connected to the lever B and brake-beams C', said lever being fulcrumed on beams C.

H is a rod uniting the equalizer with the lever, as shown.

It can readily be seen that should one of the rods F or H break, the equalizer A' would actuate one of the rods, and thus leave one set of shoes in operation.

Fig. 3 represents the arrangement of the equalizer A' actuated by air, steam, or vacuum brake, connected to the pivoted link K. By this arrangement we can use one or both brake staffs D at the same time with the air or vacuum brake; or either one can be used independently of the other.

Having thus fully described our invention, what we claim as new, and desire to secure by Letters Patent, is—

In a car-brake, the rod A, equalizer A', rod F, and lever B, in combination with the rods B' B' and H, the whole being connected in the manner and for the purposes set forth.

In testimony whereof we affix our signatures in presence of two witnesses.

S. P. WELLER.
SILVANUS WANEE.
GEO. ROESCH.

Witnesses:
ELLIS J. AGNEW,
W. GORTON THOMAS.